US008224656B2

(12) United States Patent
Scholz et al.

(10) Patent No.: US 8,224,656 B2
(45) Date of Patent: Jul. 17, 2012

(54) SPEECH RECOGNITION DISAMBIGUATION ON MOBILE DEVICES

(75) Inventors: Oliver Scholz, Kirkland, WA (US); Robert L. Chambers, Sammamish, WA (US); Julian James Odell, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 928 days.

(21) Appl. No.: 12/049,243

(22) Filed: Mar. 14, 2008

(65) Prior Publication Data
US 2009/0234647 A1 Sep. 17, 2009

(51) Int. Cl.
G10L 21/06 (2006.01)
(52) U.S. Cl. ...... 704/276; 704/251; 704/270; 704/270.1
(58) Field of Classification Search .................. 704/276, 704/251, 270, 270.1
See application file for complete search history.

(56) References Cited

U.S. PATENT DOCUMENTS

| | | | |
|---|---|---|---|
| 6,006,183 A * | 12/1999 | Lai et al. ...................... | 704/235 |
| 6,912,498 B2 | 6/2005 | Stevens et al. | |
| 7,085,716 B1 | 8/2006 | Even et al. | |
| 7,143,043 B1 | 11/2006 | Vandermeijden | |
| 7,191,135 B2 | 3/2007 | O'Hagan | |
| 7,209,880 B1 | 4/2007 | Gajic et al. | |
| 2004/0172258 A1 | 9/2004 | Dominach et al. | |
| 2005/0203740 A1 | 9/2005 | Chambers et al. | |
| 2006/0116885 A1 | 6/2006 | Shostak | |
| 2006/0149551 A1 * | 7/2006 | Ganong et al. ............. | 704/270.1 |
| 2006/0190256 A1 | 8/2006 | Stephanick et al. | |
| 2007/0033037 A1 * | 2/2007 | Mowatt et al. ................ | 704/251 |
| 2007/0112571 A1 | 5/2007 | Thirugnana | |

OTHER PUBLICATIONS

Gorrell, G., "Recognition Error Handling in Spoken Dialogue Systems," *Proceedings of the 2nd International Conference on Mobile and Ubiquitous Multimedia*, 5 pages (Dec. 10-12, 2003).

\* cited by examiner

*Primary Examiner* — Vincent P Harper
(74) *Attorney, Agent, or Firm* — Merchant & Gould

(57) ABSTRACT

A method, program storage device and mobile device provide speech disambiguation. Audio for speech recognition processing is transmitted by the mobile device. Results representing alternates identified to match the transmitted audio are received. The alternates are displayed in a disambiguation dialog screen for making corrections to the alternates. Corrections are made to the alternates using the disambiguation dialog screen until a correct result is displayed. The correct result is selected. Content associated with the selected correct result is received in parallel with the receiving of the results representing alternates identified to match the transmitted audio.

20 Claims, 7 Drawing Sheets

SPEECH RECOGNITION DISAMBIGUATION ON MOBILE DEVICES

BACKGROUND

Mobile devices continue to become smaller and more compact as the amount of information such devices provide continues to increase. Moreover, the convergence of functions and constant addition of features create layers of complexity in navigation and usability of mobile user interfaces. As a result, the user interface has become an important aspect to consumers when choosing a mobile device. Components of the user interface are the visual display and screen attributes, and the response/input methods that include input keys. Traditional keyboards recognized as numeric pads have multiple tasks associated to each, depending on what mode is being used. Alternative factors such as audio input and volume, as well as alternative single function buttons for camera and web browsing activation are added on specific devices for increased ease-of-use. Small keypads, directional pads (DPads) or joysticks are provided on some mobile devices to provide additional navigation functionality to the user interface. In addition, many small devices either have a limited keyboard (small QWERTY) or a touch screen. Other devices have no keyboard/keypad at all.

To provide further ease of use, speech recognition systems and speech synthesis offer attractive solutions to overcome input and output limitations of user interfaces for small mobile devices. Mobile devices have evolved to now include increased memory and processing capacity that allows speech input and output to be well suited for mobile device navigation, menu selections, command initiation and execution, and other interaction with the mobile devices.

However, for a variety of reasons, all speech recognition systems have less than 100% accuracy. For example, a voice command may be used to initiate an intended action. Nevertheless, the speech recognition system may not fully recognize the voice command. This problem is compounded when the correct speech recognition match is not displayed as a single entity, but instead is present as subsets of other entities, or is only partially present.

It is with respect to these and other considerations that the present invention has been made.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

In accordance with one embodiment, a method for providing speech disambiguation on a mobile device includes transmitting audio for speech recognition processing, receiving results representing alternates identified to match the transmitted audio, displaying the alternates in a disambiguation dialog screen for making corrections to the alternates, making corrections to the alternates using the disambiguation dialog screen until a correct result is displayed and selecting the correct result.

According to another embodiment, a computer-readable medium that stores a set of instructions which when executed performs a method for providing speech disambiguation on a mobile device is provided. The method executed by the set of instructions includes transmitting audio for speech recognition processing, receiving results representing alternates identified to match the transmitted audio, displaying the alternates in a disambiguation dialog screen for making corrections to the alternates, making corrections to the alternates using the disambiguation dialog screen until a correct result is displayed and selecting the correct result.

According to another embodiment, a mobile device includes a processor and a memory including a computer-readable medium having computer-executable instructions for performing operations including transmitting audio for speech recognition processing, receiving results representing alternates identified to match the transmitted audio, displaying the alternates in a disambiguation dialog screen for making corrections to the alternates, making corrections to the alternates using the disambiguation dialog screen until a correct result is displayed and selecting the correct result.

These and other features and advantages will be apparent from a reading of the following detailed description and a review of the associated drawings. It is to be understood that both the foregoing general description and the following detailed description are explanatory only and are not restrictive of the invention as claimed.

BRIEF DESCRIPTION OF THE DRAWINGS

Referring now to the drawings in which like reference numbers represent corresponding parts throughout.

DETAILED DESCRIPTION

In the following detailed description, references are made to the accompanying drawings that form a part hereof, and in which are shown by way of illustrations specific embodiments or examples. While several exemplary embodiments and features of the invention are described herein, modifications, adaptations and other implementations are possible, without departing from the spirit and scope of the invention. These embodiments may be combined, other embodiments may be utilized, and structural changes may be made without departing from the spirit or scope of the present invention. Accordingly, the following detailed description does not limit the invention. Instead, the proper scope of the invention is defined by the appended claims.

A speech disambiguation dialog according to embodiments of the present invention allows users to select different parts of a possible recognition, and replace it either with parts of other possible recognitions, or to re-speak parts of the possible recognitions. The selection mechanism is optimized for the limited navigation capabilities of mobile devices, and optimizes the interaction model for mixed mode use, where users may use both speech recognition and keyboard input to create the right recognition.

Figure 1:
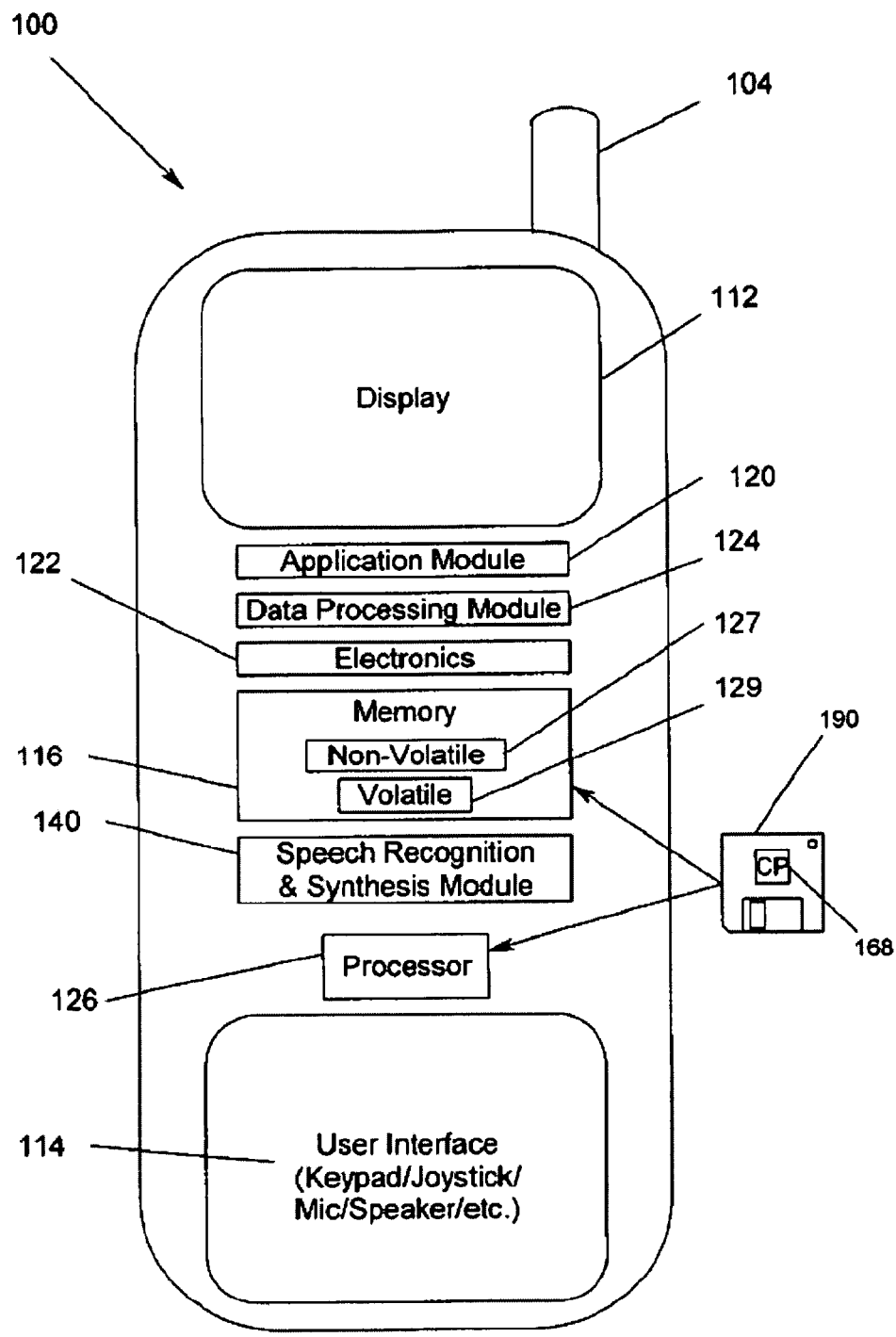
FIG. 1 is a block diagram of a mobile device according to an embodiment of the present invention.

FIG. 1 is a block diagram of a mobile device 100 according to an embodiment of the present invention. In FIG. 1, a mobile device 100 is represented using a mobile phone. The mobile device includes processor 126 that may be configured to cause applications module 120 to execute programs that implement application features, such as video encoding and decoding, camera support, and MP3 audio player support. Electronic circuitry 122 enables the transmission and reception of radio signals over the antenna 104 of phone 100. These signals are converted to digital form and communicated with data processing module 124, which may also be controlled by processor 126. Control of the transceiver and implementation of cellular communications protocols is handled by data processing module 124.

Information such as phone numbers, call status, and menus are displayed to a phone user on display 112, which may be a liquid crystal display (LCD). User interface 114, e.g., a keypad, joystick, etc., accepts user-inputted phone numbers and text, with keys for sending and ending a call in addition to numeric telephone keys. Control over keypad 114 is handled by data processing module 124, while display 112 is controlled by applications module 120.

Separate processors, although not shown in FIG. 1, may be provided to implement the modules to provide a more robust phone platform. Additional processors, not shown, may also be implemented to provide capability for additional features, which may then be executed on processor 126.

User data such as call logs, phone numbers, and user preferences are stored in memory 116. Memory 116 can be non-volatile 127 or volatile 129 memory. Memory 116 can be accessed by data processing module 124 and/or by applications module 120. Some data must be transferred between data processing module 124 and applications module 120. For example, video or picture data may be received over the cell network by data processing module 124 and transferred to applications module 120 for further processing, or a digital camera image captured by applications module 120 may be sent to data processing module 124 for transmission over the cell network.

The desire to reduce the size of the phone as much as possible may render the mobile device difficult to use. A Speech recognition and synthesis module 140 may be provided to address input and output limitations of small user interfaces on small mobile devices.

Nevertheless, the limited navigation capabilities provided by the user interface of the mobile device, e.g., the keypad, joystick, etc., makes the correction of inaccurate speech recognition results difficult achieve. Accordingly, a processor 126 may be configured to implement a disambiguation dialog according to embodiments of the present invention. A disambiguation dialog according to embodiments of the present invention is used to assist in choosing the correct recognition from a set of possible matches or alternates. Alternates herein will refer to all results generated by a speech recognition device as a possible match to a spoken utterance.

Embodiments of the present invention may take the form of an entirely software embodiment or an embodiment containing both hardware and software elements. In a preferred embodiment, the invention is implemented in software, which includes but is not limited to firmware, resident software, microcode, etc. Furthermore, embodiments of the present invention may take the form of a computer program product 190 accessible from a computer-usable or computer-readable medium 168 providing program code for use by or in connection with a processor or any instruction execution system.

For the purposes of this description, a computer-usable or computer readable medium 168 can be any apparatus that can contain, store, communicate, propagate, or transport the program for use by or in connection with the instruction execution system, apparatus, or device. The medium 168 may be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A system suitable for storing and/or executing program code will include at least one processor 126 coupled directly or indirectly to memory 116. The memory 116 can include local memory employed during actual execution of the program code, bulk storage, and cache memories which provide temporary storage of at least some program code in order to reduce the number of times code must be retrieved from bulk storage during execution.

Accordingly, the computer program 190 comprise instructions which, when read and executed by the processor 126 of FIG. 1, causes the processor 126 to perform the steps necessary to execute the steps or elements of the present invention.

Figure 2:
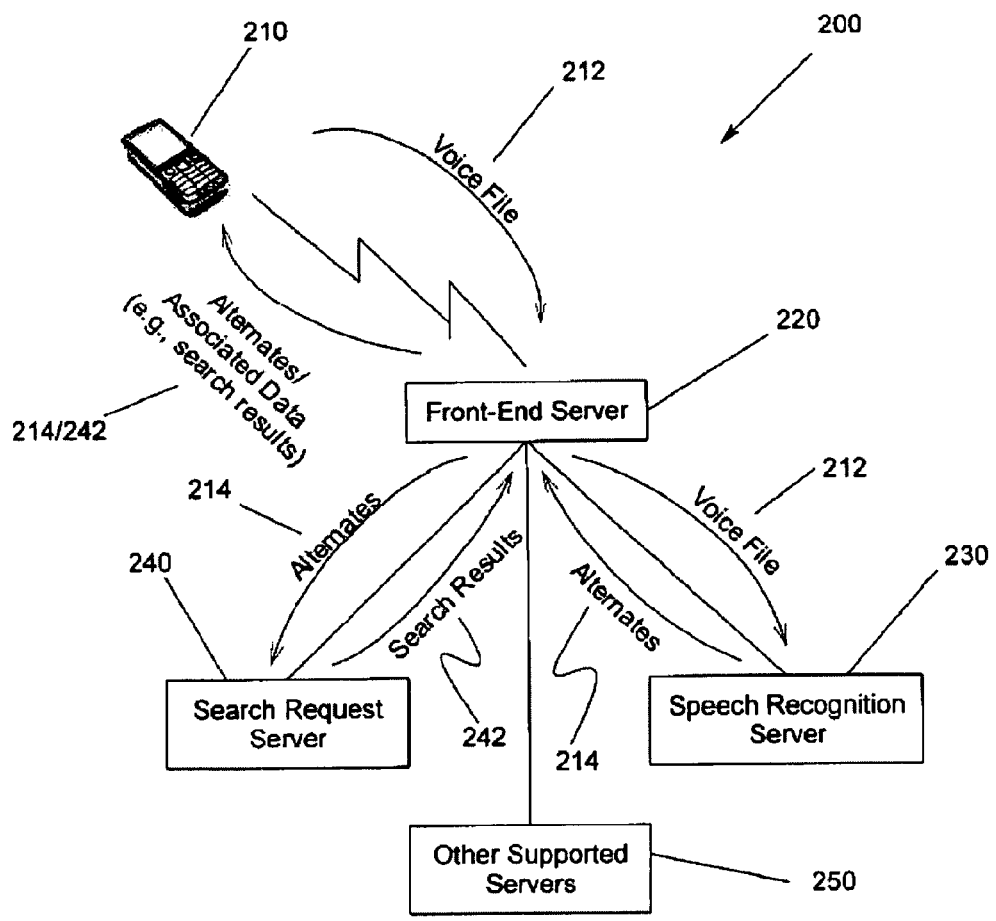
FIG. 2 is a block diagram of a system for supporting a speech disambiguation dialog according to embodiments of the present invention.

FIG. 2 is a block diagram of a system 200 for supporting a speech disambiguation dialog according to embodiments of the present invention. In FIG. 2, a mobile device 210 is used to transmit a voice file 212 created by a user utterance for processing by a speech recognition server 230. A front-end server 220 receives the voice file 212. The front-end server 220 receives all appropriate communication and routes such communication to proper processing servers. The front-end server 220 routes the voice file 212 to a speech recognition server 230. The speech recognition server 230 determines a number of alternates 214 that are a match for the voice file 212. Returned responses maybe ranked by the speech recognition server 230 according to confidence of the match. The speech recognition server 230 provides the alternates 214 to the front-end server 220. The front-end server 220 forwards the alternates 214 to the mobile device 210, wherein the alternates 214 are provided for review by the user using either speech or text. Corrected alternates may be forwarded back to the speech recognition server 230.

The front-end server 220, after receiving responses from the speech recognition server 230, may act on the responses to provide additional services to the mobile device 210. For example, if the voice file 212 is a search request from a search application at the mobile device 210, the front-end server 220 may also route the alternates 214 to a search request server 240, i.e., a search engine. For example, a voice file 212 transmitted for finding the location of a business may include a business name, an address, e.g., street, city, state, zip, a white page name, and/or a place of interest. Search results 242 associated with each of the alternates 214 returned by the speech recognition server 230 identified as being a possible match for the voice file 212 may be sent to the mobile device 210. Such search results may be cached on the mobile device 210 (e.g., in non-volatile memory 127, FIG. 1) so that once the user selects one of the alternates 214 as an intended response, a search result 242 that maps to the selected alternate identified as an intended response is immediately returned from the cache of the mobile device 210. However, those skilled in the art will recognize that the embodiments of the present invention are not meant to be limited to search applications. Embodiments of the present invention may also be applicable to other applications such as text messaging applications, email, short message dictations, etc. System 200 may therefore also include additional servers 250.

Figure 3:
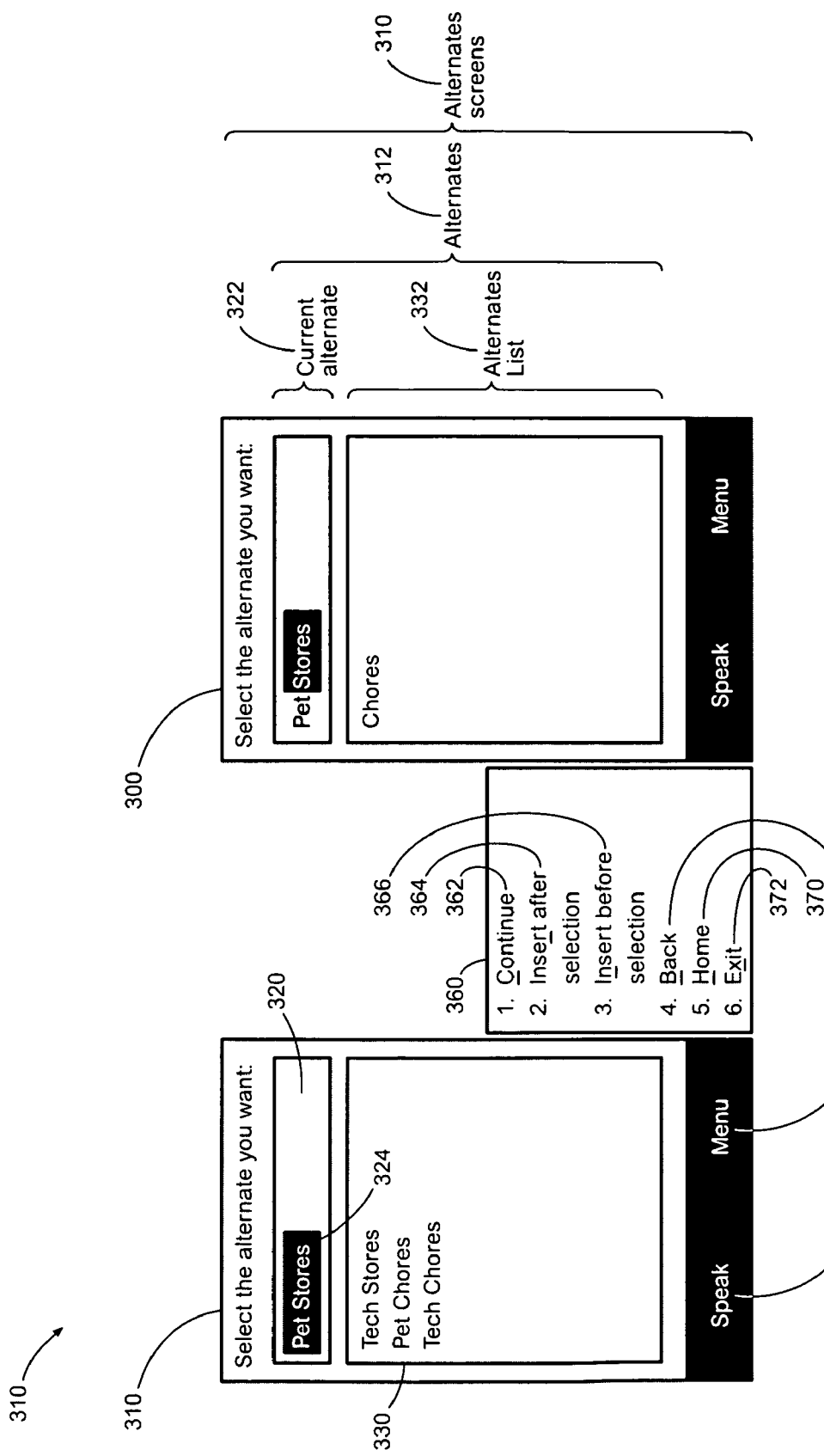
FIG. 3 shows a disambiguation dialog screen according to an embodiment of the present invention.

FIG. 3 shows a disambiguation dialog screen 300 according to an embodiment of the present invention. The disambiguation dialog screen 300 provides the user with options to correct speech recognition results returned to the mobile device. In FIG. 3, an alternates screen 310 displays alternates 312. The alternates screen 310 includes a text box 320 for displaying a first alternate. The text box 320 reflects the first (highest confidence) alternate or the current alternate. The alternates screen 310 includes an alternates box 330 that shows an alternates list 332 associated with the first/current alternate, i.e., the text displayed in the text box 320, in order of likelihood of matching the vocal expression transmitted by the user for speech recognition processing.

In FIG. 3, the text box 320 displays "Pet Stores". A list of alternatives box 332 is displayed below the text box 320 in the primary display area. The disambiguation dialog screen 300 allows correction using both spoken and typed input. To enable correction using a new utterance, the disambiguation dialog screen 300 also includes a speak option interface 340 that allows the user to replace any selected item with a new utterance. For example, FIG. 3 assumes that user has said "Pet Stores" 324. A speak button 340 in the disambiguation dialog screen 300 is enabled only when the focus is in the text box. Selecting the speak button 340 in the disambiguation dialog screen 300 brings up a Listening screen, which reflects a new utterance is to be spoken. After a new utterance is accepted, a Thinking screen would then be displayed to indicate alternates 312 for the new utterance are being generated. When the new alternates are returned, the new alternates may replace the current alternates.

A menu button 350 may be used to provide a menu 360 of user options. The menu 360 may be configured to provide options for the user to select. For example, in FIG. 3, a user may select Continue 362 to move to the results screen using the string in the text box 320. The Insert after selection 364 places the insertion point directly at the end of the current selection in text box 320. The Insert before selection 366 places the insertion point directly in front of the current selection in text box 320. Selecting Back 368 returns to the screen from where the user initiated speech and selecting Home 370 returns to the home screen. The selection of Exit 372 closes the application.

The disambiguation dialog screen 300 allows the user to correct the recognition in a variety of ways. For example, the user may speak the entire sentence by selecting Speak 340 and saying their utterance again. The user may also select only the word Stores 324 in the current alternate text box 320, and re-speak that word again by selecting Speak 340. The user may also select the incorrect word in the text box 320 by navigating left or right, e.g., using a Dpad or joystick, until the right selection, and replace that word by picking the right word in the alternates list 332 by navigating up or down in the alternates list 332, followed by signaling acceptance, or by selecting Continue 362 from the menu.

Accordingly, the disambiguation dialog screen 300 according to embodiments of the present invention allows a user to select words and strings on a mobile speech recognition device via a user interface, such as a Dpad or joystick. The user may move the Dpad/joystick right or left to cycle through selections, wherein the selections may be configured to cycle through Word1, Word2, WordN, All. Moving the Dpad/joystick in the opposite direction may reverse the cycle. Selections may show only the part of the alternates relevant to that selection, e.g., whole string alternates for an All selection, word alternates for word selections, etc. Speaking over a selection replaces only that part of the selection, and alternates for the re-spoken utterance are "woven" into the full string alternates, as described above. A selection may be typed over to replace that selection to correct the alternate. Alternatively, a cursor may be inserted into the current alternate text box to allow users to type additional words/characters into the text box to arrive at the correct alternate with minimal editing.

The time beteween a spoken utterance and the return of a speech recognition result may be as long as 2 to 5 seconds. This period is referred to as the laxity of the system. For the first utterance, laxity of 2-5 seconds is acceptable. When the returned speech recognition results are not correct, the user may initiate correction using the disambiguation dialog screen 300, e.g., as described above. However, if the user must wait for content or other results associated with the correct speech recognition results to be returned, the additional laxity is unacceptable. Accordingly, processing, such as searching for content associated with the speech recognition results, is performed in parallel to the return of the alternates to the mobile device and the correction of the alternates using the disambiguation dialog screen 300.

Referring again to FIG. 2, once the speech recognition server 230 has generated the alternates 214 that the speech recognition server 230 thinks the user might have said, such alternates 214 may be provided to a search engine 240 that can perform a search for each of the alternates 214 provided by the speech recognition server 230. Any search results 242 associated with the alternates 214 returned from speech recognition server 230 may be streamed to the mobile device as soon as such results are available. The associated search results 242 may be cached at the mobile device 210. Accordingly, as soon as user selects a correct alternate, the correct alternate is mapped to one of the search results 242 stored in cache and the matching associated search result 242 may be immediately displayed by the mobile device 210. Alternates 214 are preferably not cached, but rather just displayed. The streamed search results 242 for each of the provided alternates 214 are cached. The cache may use an algorithm, e.g., least recently used (LRU), to handle cache overflow. The cache may also delete alternates not selected then resort to LRU.

Figure 4A:
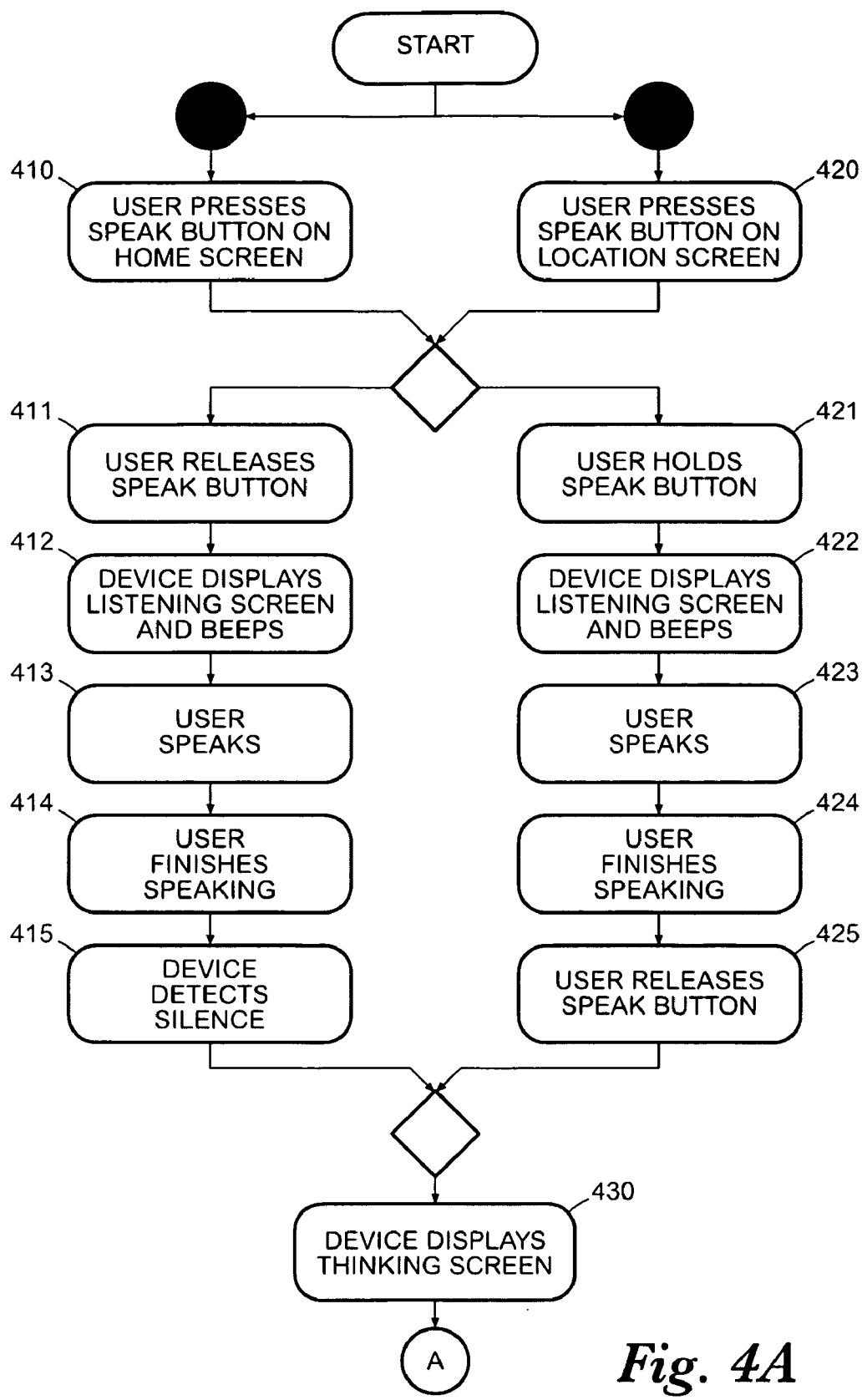
FIGS. 4a-d show a flow chart of operations performed during use of a disambiguation dialog screen according to an embodiment of the present invention.

FIGS. 4a-d show a flow chart 400 of operations performed during use of a disambiguation dialog screen according to an embodiment of the present invention. In FIG. 4a, a user presses a speak button on the home screen 410 or a location screen 420. When the user presses a speak button on the home screen 410, thereafter the user presses the speak button 411. The device displays a listening screen and provides an audible signal 412. The user then speaks 413. After the user finishes speaking 414, the device detects silence 415. The device then displays a thinking screen 430.

When the user presses a speak button on a location screen 420, the user continues to hold the speak button 421. The device displays a listening screen and provides an audible signal 422. The user then speaks 423. After the user finishes speaking 424, the user releases the speak button 425. The device then displays the thinking screen 430.

Figure 4B:
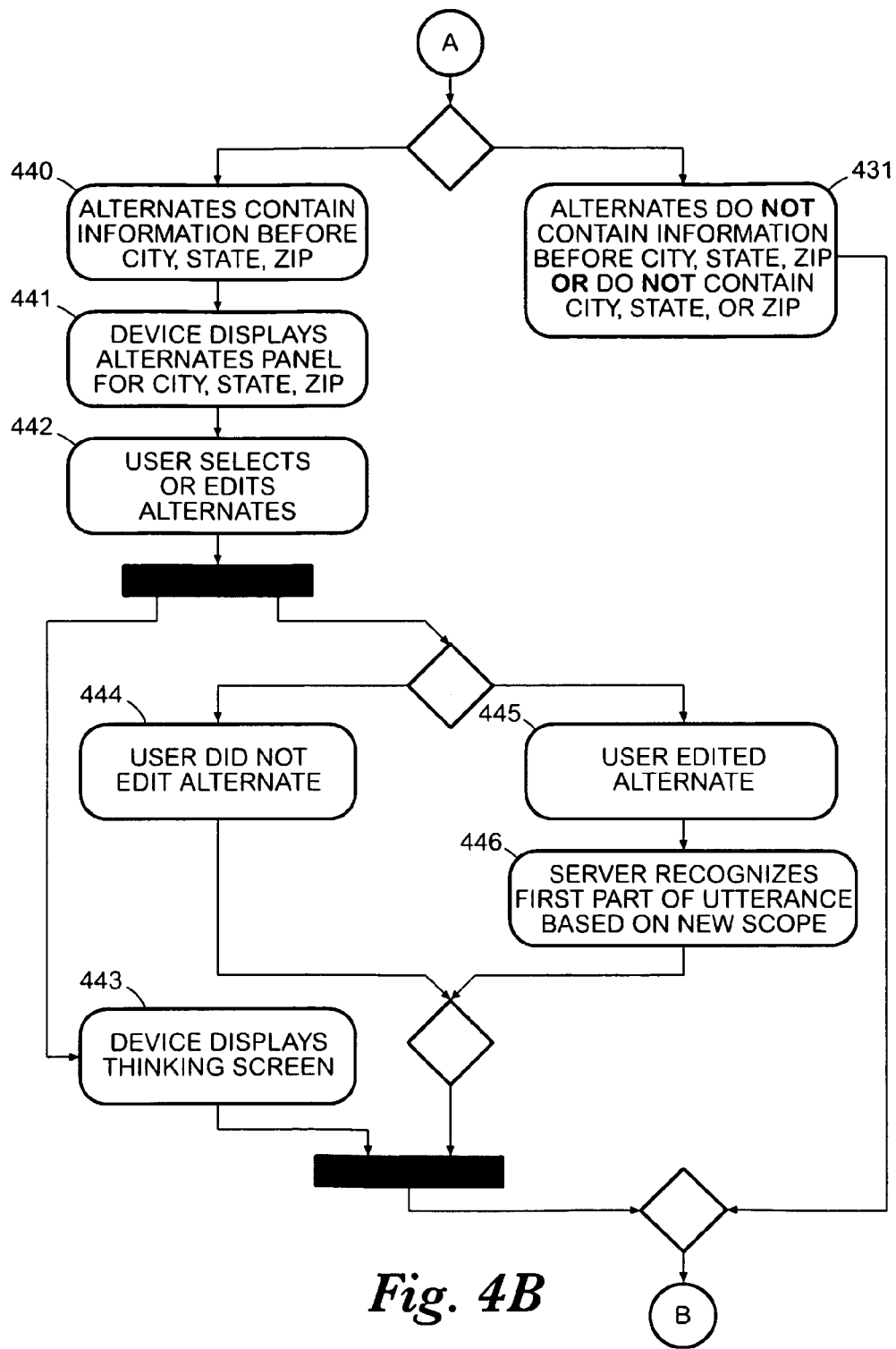

Referring to FIG. 4b, after displaying the thinking screen 430 in FIG. 4a, two paths are possible. The first path after displaying the thinking screen 430 in FIG. 4a occurs when the alternates do NOT contain information before city, state, zip OR do NOT contain city, state or zip 431.

Figure 4C:
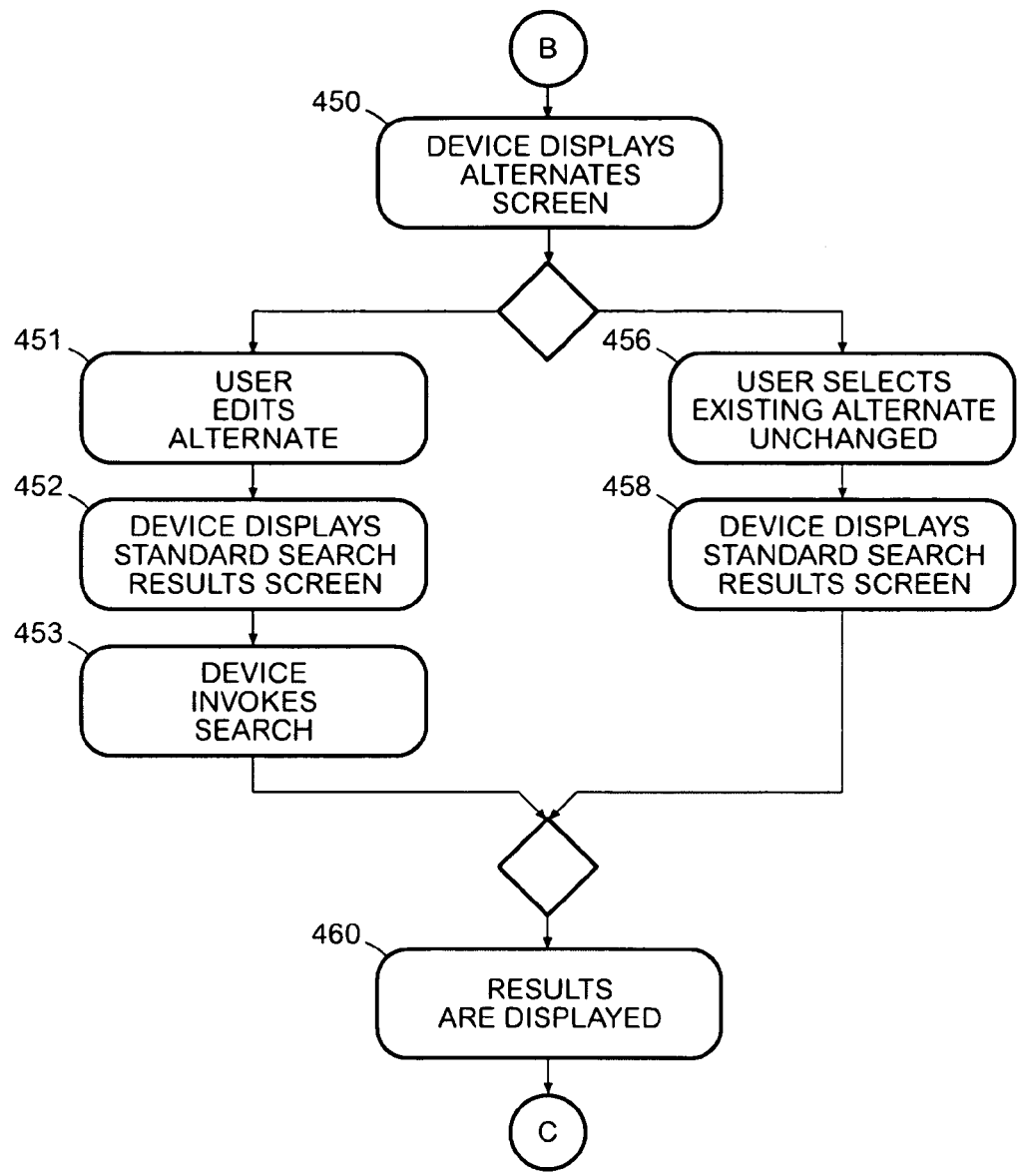

The second path after displaying the thinking screen 430 in FIG. 4a occurs when alternates are provided that contain information before city, state, zip 440. The device displays the alternates panel for city, state, zip 441. The user selects or edits an alternate 442. This presents three possible paths. First, the device displays the thinking screen 443 (before displaying the alternates screen 450 in FIG. 4c). The second path occurs when the user did not edit an alternate 444. In this case, the alternates screen is again thereafter displayed as shown in FIG. 4c. The third path occurs when the user edited an alternate 445. In this situation, the server re-recognizes a first part of the utterance based on the new scope of the search 446. Thereafter, the device displays the alternates screen 450 as shown in FIG. 4c.

FIG. 4c illustrates that the alternates screen is displayed 450. Thereafter, two additional paths are possible. The user either edits an alternate 451 or the user selects an existing alternate without any changes being made 456. When the user edits an alternate 451, the device displays a standard search results screen 452. Then, the device invokes a search 453 and results are displayed 460. When the user selects an existing alternate without any changes being made 456, the device displays the standard search results screen 458. Thereafter, the results are then displayed 460.

Figure 4D:
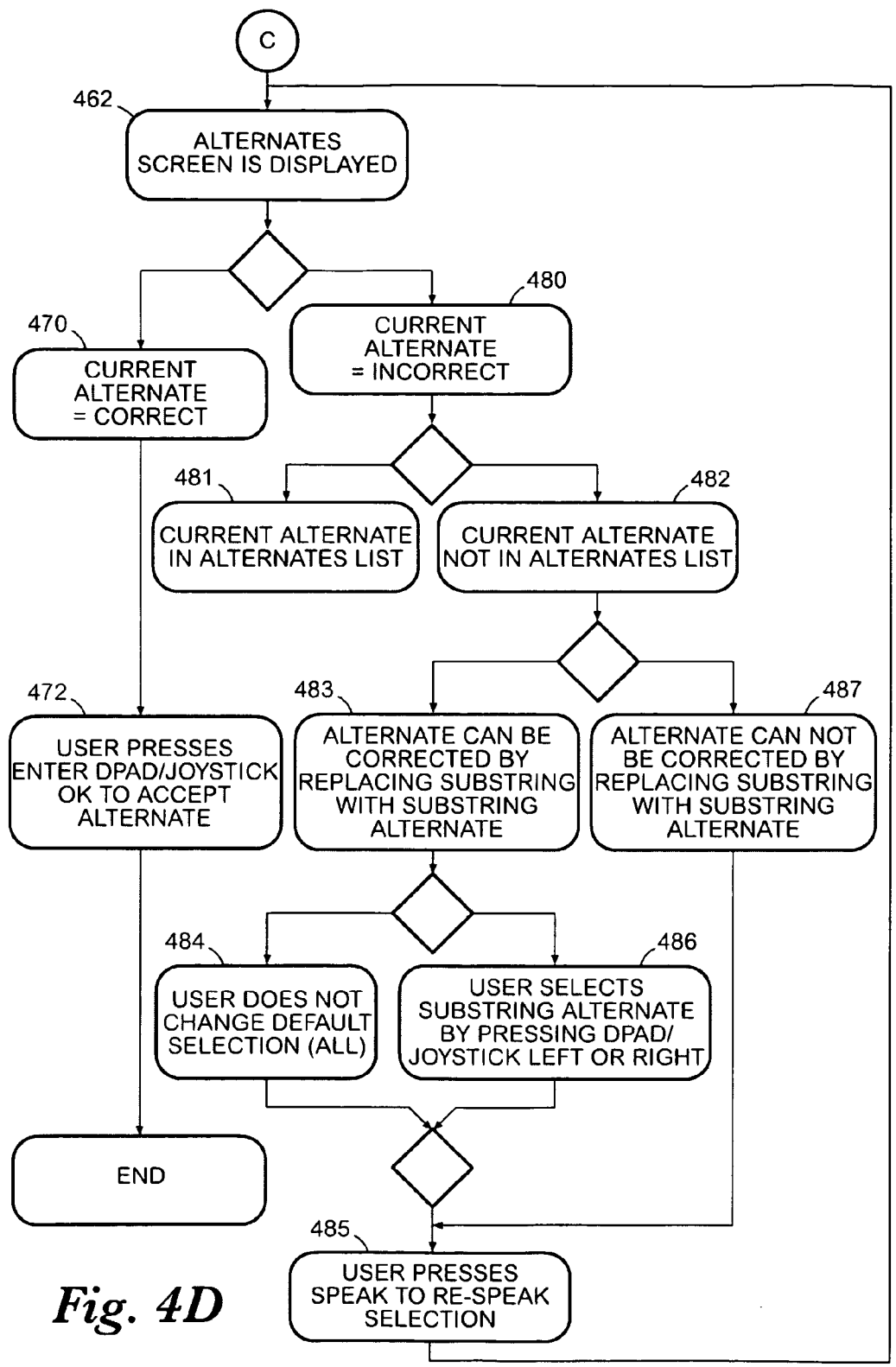

In FIG. 4d, alternates associated with the displayed results are displayed 462. The current alternate is either correct 470 or incorrect 480. When the current alternate is correct 470, the user presses Enter/Dpad/Joystick to accept the current alternate 472.

When the current alternate is incorrect 480, the alternate list may contain the correct alternate 481. In this situation, the user may simply choose the correct alternate from the alternate list. If the alternate list does not contain the correct alternate 482, the alternate can be corrected by replacing a substring with a substring alternate 483. In this situation, the user does not change the default Selection (all) 484. The user may then presses the speak button to re-speak a selection 485, wherein the process returns to display alternates 462.

Alternatively, the user may select a substring alternate by pressing the Dpad/joystick left or right 486. The user may then presses the speak button to re-speak a selection 485, wherein the process returns to display alternates 462.

When the alternate cannot be corrected by replacing a substring with a substring alternate 487, the user presses the speak button to re-speak the selection 485, wherein the process returns to display alternates 462.

The foregoing description of the embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for providing speech disambiguation on a mobile device, comprising:
   transmitting audio for speech recognition processing;
   receiving results representing alternates identified to match the transmitted audio;
   caching the received results, the cache utilizing a least recently used (LRU) algorithm to handle cache overflow;
   searching for content associated with the received results;
   displaying the alternates in a disambiguation dialog screen for making corrections to the alternates;
   making corrections to the alternates using the disambiguation dialog screen until a correct result is displayed, wherein the correction to the alternates using the disambiguation dialog screen and the receiving of the results representing the alternates are performed in parallel to the search for the content associated with the received results;
   selecting the correct result;
   upon selecting the correct result, mapping the correct result to one of the received results in the cache, the cache deleting unselected results prior to utilizing the LRU; and
   immediately displaying a matching associated search result.

2. The method of claim 1, wherein the displaying the alternates in a disambiguation dialog screen comprises displaying a text box showing a current alternate and an alternates box for displaying a list of additional alternates.

3. The method of claim 2, wherein the displaying a text box showing a current alternate comprises displaying an alternate ranked as being a most likely match to the transmitted audio.

4. The method of claim 1, wherein the making corrections to the alternates using the disambiguation dialog screen further comprises editing a current alternate in a displayed text box.

5. The method of claim 4, wherein the editing comprises entering text.

6. The method of claim 4, wherein the editing comprises selecting displayed text and replacing the selected text using speech.

7. The method of claim 1, wherein the making corrections to the alternates using the disambiguation dialog screen further comprises selecting an alternate from an alternates box.

8. The method of claim 1 further comprising displaying content associated with the selected correct result and received in parallel with the receiving of the results representing alternates identified to match the transmitted audio.

9. A computer-readable device that stores a set of instructions which when executed performs a method for providing speech disambiguation on a mobile device, the method executed by the set of instructions comprising:
   transmitting audio for speech recognition processing;
   receiving results representing alternates identified to match the transmitted audio;
   caching the received results, the cache utilizing a least recently used (LRU) algorithm to handle cache overflow;
   searching for content associated with the received results;
   displaying the alternates in a disambiguation dialog screen for making corrections to the alternates;
   making corrections to the alternates using the disambiguation dialog screen until a correct result is displayed, wherein the correction to the alternates using the disambiguation dialog screen and the receiving of the results representing the alternates are performed in parallel to the search for the content associated with the received results;
   selecting the correct result;
   upon selecting the correct result, mapping the correct result to one of the received results in the cache, the cache deleting unselected results prior to utilizing the LRU; and
   immediately displaying a matching associated search result.

10. The computer-readable device of claim 9, wherein the displaying the alternates in a disambiguation dialog screen comprises displaying a text box showing a current alternate and an alternates box for displaying a list of additional alternates.

11. The computer-readable device of claim 10, wherein the displaying a text box showing a current alternate comprises displaying an alternate ranked as being a most likely match to the transmitted audio.

12. The computer-readable device of claim 9, wherein the making corrections to the alternates using the disambiguation dialog screen further comprises editing a current alternate in a displayed text box.

13. The computer-readable device of claim 12, wherein the editing comprises entering text.

14. The computer-readable device of claim 12, wherein the editing comprises selecting displayed text and replacing the selected text using speech.

15. The computer-readable device of claim 9, wherein the making corrections to the alternates using the disambiguation dialog screen further comprises selecting an alternate from an alternates box.

16. The computer-readable device of claim 9 further comprising displaying content associated with the selected correct result and received in parallel with the receiving of the results representing alternates identified to match the transmitted audio.

17. A mobile device, comprising:
 a memory device for storing executable program code; and
 a processor, functionally coupled to the memory device, the processor being responsive to computer-executable instructions contained in the program code and operative to:
  transmit audio for speech recognition processing;
  receive results representing alternates identified to match the transmitted audio;
  cache the received results, the cache utilizing a least recently used (LRU) algorithm to handle cache overflow;
  search for content associated with the received results;
  display the alternates in a disambiguation dialog screen for making corrections to the alternates;
  make corrections to the alternates using the disambiguation dialog screen until a correct result is displayed, wherein the correction to the alternates using the disambiguation dialog screen and the receiving of the results representing the alternates are performed in parallel to the search for the content associated with the received results;
  select the correct result;
  upon selecting the correct result, map the correct result to one of the received results in the cache, the cache deleting unselected results prior to utilizing the LRU; and
  immediately display a matching associated search result.

18. The mobile device of claim 17, wherein the processor, in displaying the alternates in a disambiguation dialog screen, is operative to display a text box showing a current alternate and an alternates box for displaying a list of additional alternates.

19. The mobile device of claim 18, wherein the processor, in displaying a text box showing a current alternate, is operative to display an alternate ranked as being a most likely match to the transmitted audio.

20. The mobile device of claim 17, wherein the processor, in making corrections to the alternates using the disambiguation dialog screen, is further operative to edit a current alternate in a displayed text box.

* * * * *